United States Patent
Takeshita et al.

(10) Patent No.: US 7,635,297 B2
(45) Date of Patent: Dec. 22, 2009

(54) BLOW OUT GRILL AND AIR CONDITIONING VENTILATING SYSTEM USING THE GRILL

(75) Inventors: Kei Takeshita, Aichi (JP); Shunsuke Matsuoka, Aichi (JP)

(73) Assignee: Panasonic Corporation, Osaka (JP)

( * ) Notice: Subject to any disclaimer, the term of this patent is extended or adjusted under 35 U.S.C. 154(b) by 95 days.

(21) Appl. No.: 10/592,380

(22) PCT Filed: Mar. 16, 2005

(86) PCT No.: PCT/JP2005/005295

§ 371 (c)(1),
(2), (4) Date: Sep. 12, 2006

(87) PCT Pub. No.: WO2005/090872

PCT Pub. Date: Sep. 29, 2005

(65) Prior Publication Data

US 2007/0178826 A1    Aug. 2, 2007

(30) Foreign Application Priority Data

Mar. 18, 2004  (JP) ............................. 2004-077469

(51) Int. Cl.
*F24F 13/06* (2006.01)
*F24F 13/062* (2006.01)
*F24F 13/08* (2006.01)

(52) U.S. Cl. ................. 454/284; 454/292; 454/301
(58) Field of Classification Search ............... 454/258, 454/270, 292, 298, 299, 300, 301, 302, 303, 454/304, 305, 323, 367, 284
See application file for complete search history.

(56) References Cited

U.S. PATENT DOCUMENTS 2,269,376 A * 1/1942 O'Day ........................ 454/300

(Continued)

FOREIGN PATENT DOCUMENTS

JP          48-82741          10/1973

(Continued)

OTHER PUBLICATIONS

Titus Online Publication—Architectural Ceiling Diffuser Submittal, web address: http://web.archive.org/web/20030315223138/www.titus-hvac.com/pdf/omni.pdf (Mar. 15, 2003).*

*Primary Examiner*—Steven B McAllister
*Assistant Examiner*—Patrick F. O'Reilly, III
(74) *Attorney, Agent, or Firm*—Wenderoth, Lind & Ponack, L.L.P.

(57) ABSTRACT

There is provided a blow out grill including a duct connecting port communicated with a duct, an indoors-side opening communicated with inside of a room, a panel base portion forming a wind blowing path of carried air between the indoors side opening and an outdoors-side opening, a panel portion formed to be opposed to the panel base portion, and a blow out port communicating with the wind blowing path and formed between the panel portion and the panel base portion forming a second rib directed to a side of the panel portion at the panel base portion and forming a first rib directed to a side of the panel base portion at the panel portion. The blow out grill does not deteriorate in view of a room, is easy to clean and inexpensive and simultaneously prevents contamination of the installing face and a cold draft.

10 Claims, 3 Drawing Sheets

U.S. PATENT DOCUMENTS

| | | | | | |
|---|---|---|---|---|---|
| 2,504,472 | A | * | 4/1950 | Van Alsburg et al. | 454/302 |
| 2,644,389 | A | * | 7/1953 | Dauphinee | 454/323 |
| 2,654,305 | A | * | 10/1953 | Robertson | 454/305 |
| 3,031,944 | A | * | 5/1962 | Davidson | 454/301 |
| 3,119,320 | A | * | 1/1964 | Batchelor | 454/297 |
| 3,823,653 | A | * | 7/1974 | Roos | 454/298 |
| 3,987,713 | A | * | 10/1976 | Larkfeldt et al. | 454/305 |
| 4,078,476 | A | * | 3/1978 | Widerby | 454/323 |
| 4,109,564 | A | * | 8/1978 | Widerby | 454/302 |
| 4,335,647 | A | * | 6/1982 | Timmons | 454/300 |
| 5,556,335 | A | * | 9/1996 | Holyoake | 454/258 |
| 5,647,532 | A | * | 7/1997 | de Villiers et al. | 236/49.5 |

FOREIGN PATENT DOCUMENTS

| | | | | |
|---|---|---|---|---|
| JP | 52-112659 | | | 8/1977 |
| JP | 52-111954 | | | 8/1979 |
| JP | 63108144 | A | * | 5/1988 |
| JP | 05039935 | A | * | 2/1993 |
| JP | 10-306933 | | | 11/1998 |
| JP | 10-325590 | | | 12/1998 |
| JP | 2001-041519 | | | 2/2001 |
| JP | 2002005470 | A | * | 1/2002 |

* cited by examiner

BLOW OUT GRILL AND AIR CONDITIONING VENTILATING SYSTEM USING THE GRILL

This application is a U.S. national phase application of PCT International Application PCT/JP2005/005295.

TECHNICAL FIELD

The present invention relates to a blow out grill as a distal end opening provided in a ventilation apparatus for supplying air from outside of a room, into a room and an air conditioning ventilation system using the same.

BACKGROUND ART

An example of a blow out grill in the background art for blowing out air in a vertical direction relative to an installing face is disclosed in Japanese Patent Unexamined Publication No. H10-325590.

However, in a blow out grill of a type which blows out air in the vertical direction relative to the installing face, air supplied from the blow out grill may directly impinge on a person in a room. Therefore, there is the problem that when supplied air is air from outside of a house in the winter, or simply cooler air in the summer, a blown out air flow constitutes a cold draft. On the other hand, although when air is blown out in a horizontal direction relative to the installing face an unpleasant feeling due to the cold draft (hereinafter, referred to as unpleasant feeling) can be prevented, there is the problem that the air flows along the installing face by the Coanda effect, and powder, dust, and the like, mixed in the air adheres to and contaminates the installing face.

Hence, there is disclosed an example of a blow out grill simultaneously resolving the two problems by using a plurality of sheets of fins in Japanese Patent Unexamined Publication No. H10-306933.

The blow out grill of the background art will be explained in reference to FIG. 6 as follows. As shown by FIG. 6, the blow out grill is constituted by panel base portion 101 having a room inner side opening and a room outer side opening to form a path for blowing carried air therebetween, panel portion 102 connected to panel base portion 101 and communicated with the blowing path, and a plurality of fins 103 provided at panel portion 102. Further, the respective fins 103 are installed such that imaginary extended lines thereof substantially constitute a radial shape. In this way, air supplied from the blow out grill can be diverged with a uniform wind speed and in a wide range, and therefore air can be blown out at a low wind speed. As a result, since a force of adhesion to the installing face is proportional to the wind speed, the installing face can be prevented from being contaminated by the Coanda effect. Further, since a very low wind speed is achieved in a vicinity of a person in a room, the unpleasant feeling can be alleviated.

However, in this case, there is the problem that the view in a room is deteriorated since powder and dust in the supplied air adheres to all of the fins. Further, even when the fins are cleaned, there is the problem that it is very difficult to clean the fins since the intervals between the fins are narrow. Further, there are the problems that the angle of the fins needs to be set accurately, and that the number of parts is increased by using a plurality of fins, and therefore the blow and grills become expensive.

SUMMARY OF THE INVENTION

The invention provides a blow out grill including an outdoors-side opening communicated with a duct, an indoors-side opening communicated with inside of a room, a panel base portion forming a wind blowing path of carried air between the indoors-side opening and the outdoors-side opening, a panel portion formed to be opposed to the panel base portion, and a blow out port communicating with the wind blowing path and formed between the panel portion and the panel base portion. The blow out part forms a first airflow-guiding projected portion directed to a side of the panel portion at the panel base portion, and a second air flow guiding projected portion directed to a side of the panel base portion at the panel portion. Further, the invention provides an air conditioning ventilation system using the blow out grill.

BRIEF DESCRIPTION OF DRAWINGS

FIG. 6 is a side sectional view showing an embodiment of a blow out grill of a background art.

DETAILED DESCRIPTION OF PREFERRED EMBODIMENTS

Figure 1:
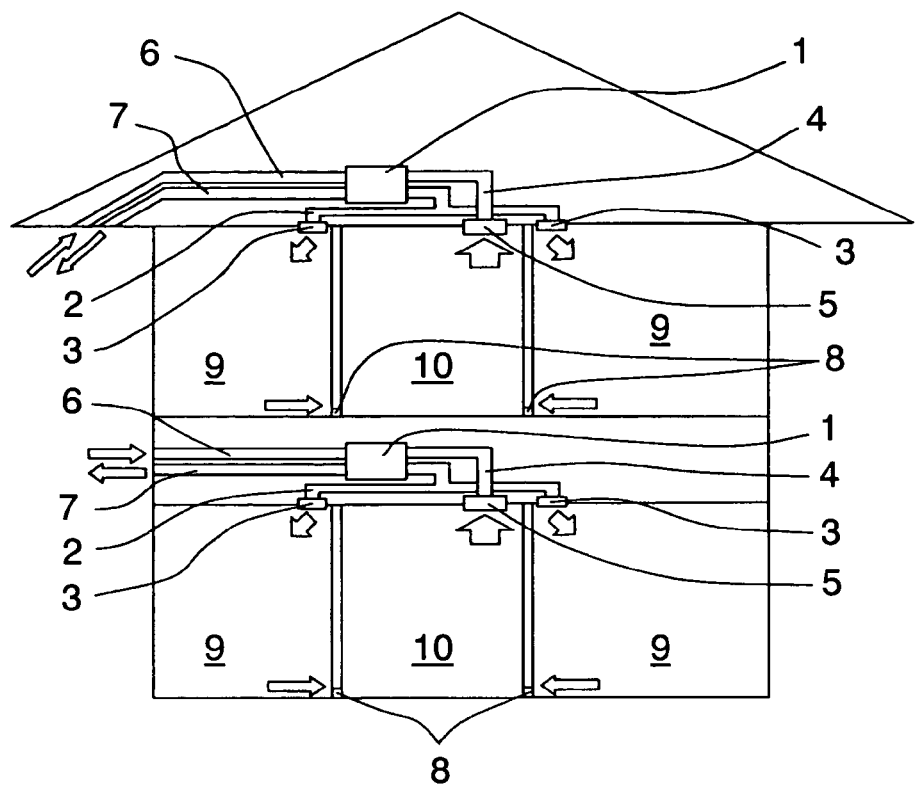
FIG. 1 is a side view showing a state of installing an air conditioning ventilation system including a blow out grill according to an embodiment of the invention.

The blow out grill of the present invention is a blow out grill provided to blow out air supplied to the inside of a room by way of a duct. The blow out grill includes an outdoors-side opening communicated with the duct, an indoors-side opening communicated with the inside of the room, a panel base portion forming a wind blowing path of the carried air between the indoors side opening and the outdoors-side opening, a panel portion formed to be opposed to the panel base portion, and a blow out port, communicated with the wind blowing path and formed between the panel portion and the panel base portion, forming a first air-flow-guiding projected portion directed to a side of the panel portion at the panel base portion and a second air-flow-guiding projected portion directed to a side of the panel base portion at the panel portion. In this way, an angle of the carried air blown out from the blow out grill can be set to an angle which is not excessively proximate to an installing face of the blow out grill and does not cause an unpleasant draft. Also, an excellent view of the inside of the room can be achieved and a blown out air stream can cover the corners inside of the room. Thus are achieved the results that an inner portion of the panel base portion is not seen by a person in the room, the cleaning of the panel portion is easy, and the blow out grill is inexpensive.

In an embodiment of the blow out grill of the present invention, the second air flow guiding projected portion is provided at an outer peripheral edge of the panel portion. In this way, by setting the blow out angle to an appropriate angle, the blown out air stream can cover the corners inside a room. Further, the view inside the room can be prevented from being deteriorated by making the inner portion of the panel base portion difficult to be seen by a person in the room.

In another embodiment of the blow out grill of the present invention, a third air-flow-guiding projected portion is formed on an inner side of the second air-flow-guiding projected portion, and the third air-flow-guiding projected portion is projected closer to the side of the panel base portion than the second air-flow-guiding projected portion. In this way, air flow in a direction away from the installing face is directed by the third air-flow-guiding projected portion, and therefore contamination of the installing face can be prevented by constraining the air flow which is near the installing face.

In another embodiment of the blow out grill of the present invention, the panel portion is formed in a polygonal shape, and the second air-flow-guiding projected portion formed at a corner portion thereof is projected closer to the side of the panel base portion than the second air-flow-guiding projected portion formed at other portions excluding the corner portion. In this way, with regard to an air flow which tends to be deviated to the side of the installing face at the corner portion, the air flow away from the installing face tends to be formed by the second air flow guiding projected portion which is more projected, and therefore contamination of the installing face can be prevented by constraining the air flow which is near the installing face.

In another embodiment of the blow out grill of the present invention, the panel portion is formed in a polygonal shape, and the third air-flow-guiding projected portion is formed at a corner portion thereof. In this way, with regard to the air flow which tends to be deviated to the side of the installing face at the corner portion, formation of an air flow in a direction away from the installing face by the second air-flow-guiding projected portion which is projected further is promoted, and therefore contamination of the installing face can be prevented by constraining the air flow which is near the installing face.

In another embodiment of the blow out grill of the present invention, the third air-flow-guiding projected portion is formed in an L-like shape toward the panel portion. In this way, contamination of the installing face can be prevented by constraining the air flow which is near the installing face, and the strength of the panel portion is improved.

In another embodiment of the blow out grill of the present invention, a height of the first air flow guiding projected portion, the second air flow guiding projected portion, or the third air guiding projected portion is able to be changed. In this way, the installing face is not contaminated and an unpleasant draft can be prevented, despite a wind amount or a wind speed of the carried air which may differ depending on the installed environment.

The blow out grill of the present invention may further include an interval adjusting apparatus to change or to set an interval between the panel base portion and the panel portion. In this way, the wind speed of the air blown out can be adjusted in accordance with the environment.

In another embodiment of the blow out grill of the present invention, the blow out port is disposed between an outer peripheral portion of the panel portion present on an inner side of an outer peripheral edge of the panel base portion and the panel base portion. In this way, the blow out port can direct the air towards a lower side, and therefore flow of the air which is near the installing face is constrained by promoting the air flow in a direction away from the installing face, and thus contamination of the installing face can be prevented.

In an embodiment of the blow out grill of the present invention, the indoors-side opening of the panel base portion is in a bell-mouthed shape. In this way, a pressure loss of the blow out grill can be reduced.

In an embodiment of the blow out grill of the present invention, an angle of the outdoors side opening can arbitrarily be set relative to the panel base portion. In this way, a duct can be attached from an arbitrary angle. The blow out grill of the present invention may further include a wind amount control apparatus capable of changing an opening area of the outdoors-side opening by being overlapped with the outdoors-side-opening and being slid along an inner face of the panel base portion. In this way, the wind amount of carried air supplied to the inside of the room can be adjusted. This achieves an effect that an inner portion of the panel base portion is not seen by a person in the room, the panel portion is easy to clean, and the blow out grill is inexpensive.

An air conditioning ventilation system of the present invention is provided with an air flow apparatus communicating between a room provided with the blow out grill and the outside of the room. The blow out grill is provided in a ceiling disposed above the air flow apparatus, and carried air is blown out in a direction away from the air flow apparatus. In this way, carried air is exhausted from the air flow apparatus to the outside of the room after sufficiently circulating inside the room.

An example of an embodiment of the invention will be explained in detail with reference to FIG. 1-FIG. 5 as follows. The drawings are schematic views and do not show respective positional relationships dimensionally correctly. Further, the invention is not limited to the embodiment. A first, a second, and a third rib represent a first, a second, and a third air-flow-guiding projected portion.

An arrow mark in the drawings represents a flow of air.

EMBODIMENT

As shown by FIG. 1, a ventilation system for carrying out ventilation inside of a room having a blow out grill according to the embodiment includes the following. The system is constituted by ventilation unit 1 for introducing carried air from outside of a house into the house and exhausting contaminated air from inside of the house to outside the house, blow out grill 3 for supplying air from ventilation unit 1 by way of indoors introducing pipe 2, sucking grill 5 for exhausting air to ventilation unit 1 by way of indoors exhausting pipe 4, and outdoors introducing pipe 6 for introducing carried air from outside of the house to ventilation unit 1, and outdoors exhausting pipe 7 for exhausting contaminated air from ventilation unit 1 to outside of the house, and air flow apparatus 8 for exhausting contaminated air inside of a room to outside of the room.

Figure 2:
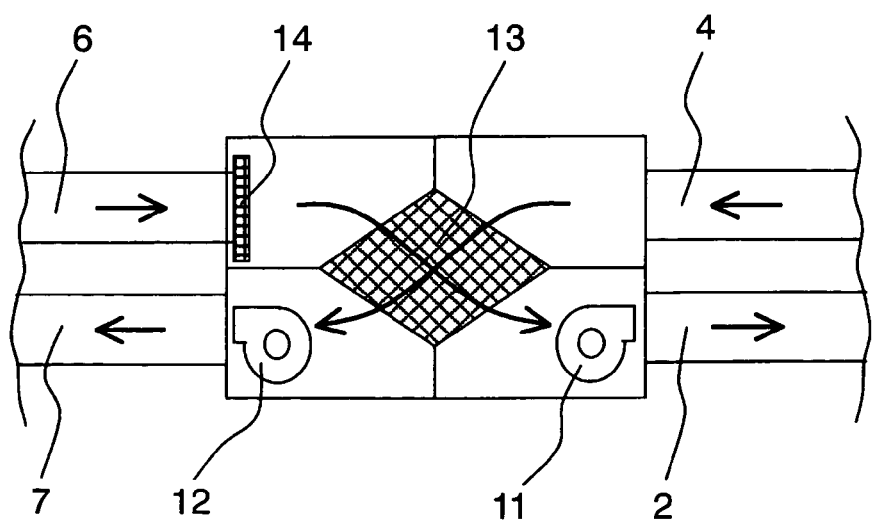
FIG. 2 is a sectional view showing an embodiment of a ventilation unit communicated with the blow out grill shown in FIG. 1.

Here, as shown by FIG. 2, ventilation unit 1 includes supply air blowing apparatus 11 for making carried air flow from outdoors introducing pipe 6 to indoors introducing pipe 2, and exhaust air blowing apparatus 12 for making contaminated air from inside of the house flow from indoors exhausting pipe 4 to outdoors exhausting pipe 7. Further, ventilation unit 1 includes heat exchange element 13 as heat exchanging means for supply and exhaust air, and filter 14 as means for cleaning inputted outdoors air. With regard to these, conventional components can be used.

As an example, the supply air blowing apparatus and the exhaust air blowing apparatus could be a blower, or the like. constituted by a motor and a fan.

As an example of air flow apparatus 8 as air flowing means, the following is given. When air flow apparatus 8 is installed in a lower portion inside of a room, an undercut portion of a door or a ventilation louver is conceivable. When air flow apparatus 8 is installed in an upper portion inside of the room, a vent or a blower installed above a door is conceivable.

Figure 3:
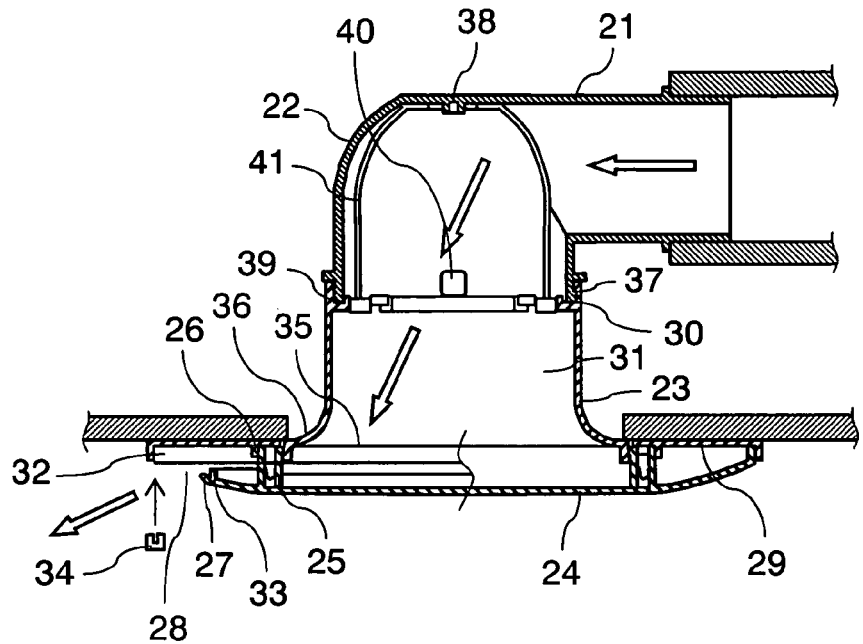
FIG. 3 is a sectional view showing an embodiment of the blow out grill shown in FIG. 1.
Figure 4:
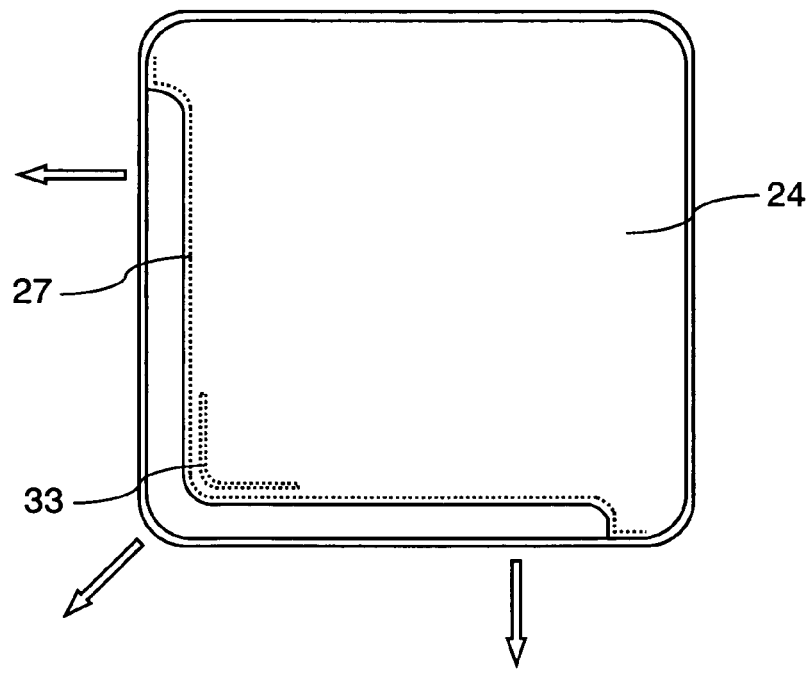
FIG. 4 is a plane view viewed from a lower side in a state of installing the blow out grill shown in FIG. 1.
Figure 5:
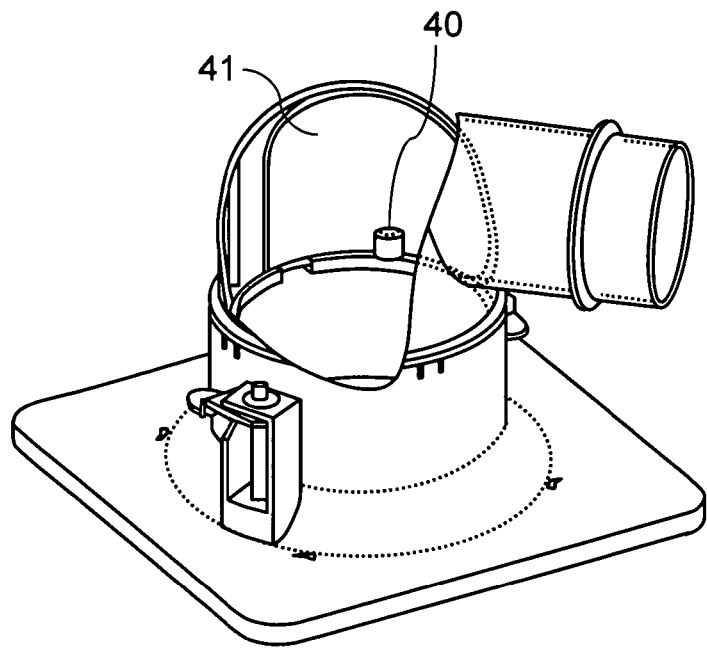
FIG. 5 is a partially sectional perspective view showing an embodiment of the blow out grill shown in FIG. 1.
Figure 5:
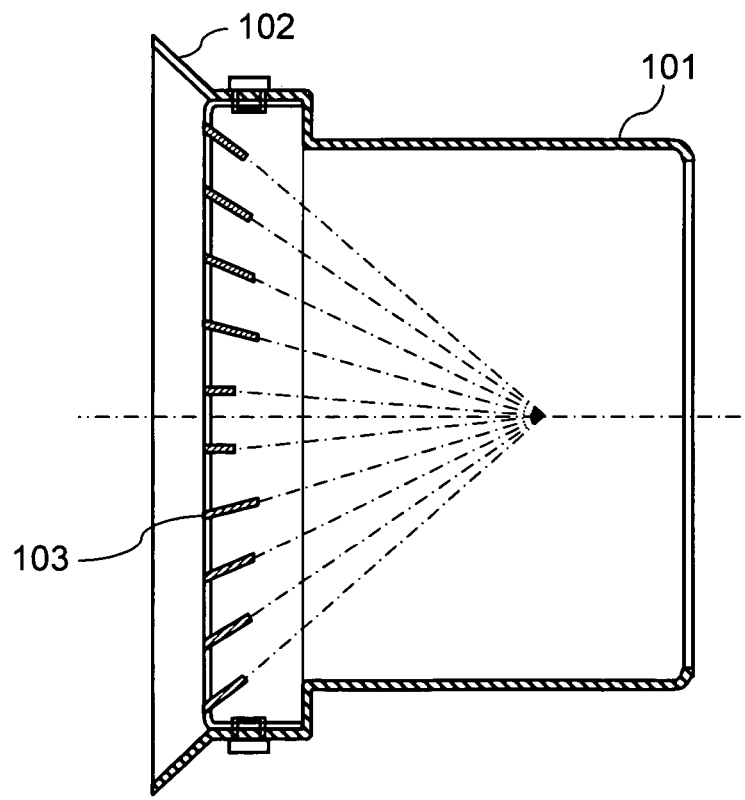

Next, as shown by FIG. 3-FIG. 5, the blow out grill according to the invention includes duct connecting portion 22 having duct connecting port 21 constituting an outdoors-side opening for introducing carried air, and panel base portion 23 having a mounting portion which is mountable to duct connecting portion 22, and arranged with panel portion 24 attachable and detachable to and from a position opposed to panel base portion 23, and blow out port 28 is formed between panel portion 24 and panel base portion 23. Panel portion 24 is engaged with panel base portion 23 by boss portion 25 and claw portion 26 formed inside of panel portion 24 and panel base portion 23 to be attachable thereto and detachable therefrom. First rib 27 constituting a second air-flow-guiding projected portion is erected to form at an end portion, or in a vicinity of an end portion, of an outer peripheral portion of panel portion 24 substantially orthogonally to a face direction of panel base portion 23. Blow out portion 28 is formed between panel portion 24 and panel base portion 23. Carried air is blown out into a room from blow out portion 28 by passing through a duct connected to duct connecting portion 22.

Panel base portion 23 is formed by panel connecting face 29 including claw portion 26 for making panel portion 24 attachable and detachable and wind blowing path 31 in a cylindrical shape which is made mountable by locking portion 30 provided at an end portion of an outer periphery of duct connecting portion 22. An end portion or a vicinity of an end portion of an outer peripheral portion of panel connecting face 29 is provided with second rib 32 constituting a first air-flow-guiding projected portion formed to be erected substantially orthogonally to the face of panel portion 24. Second rib 32 is arranged on an outer side of a face of panel portion 24 to help force air blown out from blow out port 28 away from a ceiling in which blow out grill 3 is installed. Panel portion 24 is provided with third rib 33 on an inner side of first rib 27 in parallel therewith.

Third rib 33 is constituted so as to be higher than first rib 27 toward panel base portion 23. It is preferable that the height difference by about 2 mm to 5 mm, and an interval between first rib 27 and third rib 33 is about 1.5 mm to 3 mm. By a relationship of the height difference and a size of the interval, an air flow blown out from blow port 28 is blown out in a direction away from the installing face of the blow out grill. Further, it is preferable to supply the air flow to the inside of the room at an angle of about 20 degrees −30 degrees relative to the installing face, such that the air flow does not approach the installing face by second rib 32. Further, when panel portion 24 is formed in a polygonal shape as shown in FIG. 4, third rib 33 is formed substantially in an L-like shape at a corner portion thereof over two sides at an outer periphery of panel portion 24. By forming third rib 33 at the corner portion in this way, in comparison with a case of forming third rib 33 at a portion excluding the corner portion, at the corner portion, the interval between second rib 32 and first rib 27 is increased.

As a result, the air is blown out from blow out port 28 in a direction away from the installing face such that the direction is not deviated to a side of the installing face of blow out grill 3.

By forming third rib 33 substantially in an L-like shape at the corner portion, the direction of the air blown out from blow out port 28 is directed in a direction away from the installing face so as not to be deviated to the side of the installing face and also increases the strength of panel portion 24.

By boss portion 25 formed in a direction orthogonal to panel portion 24 on the inside of panel portion 24 and claw portion 26 of panel base portion 23 formed on a portion thereof at which boss portion 25 is disposed, panel portion 24 is fitted to panel base portion 23 to thereby constitute an attachable and detachable interval adjusting apparatus.

That is, an interval between panel portion 24 and panel base portion 23 is made to be adjustable. A size of an opening of blow out portion 28 can be changed by interchanging panel portion 24 by a separate panel portion having a different height of the boss.

By mounting rails 34 in a U-like shape to first rib 27 and third rib 33 of panel portion 24 and second rib 32 of panel base portion 23, there is constructed a constitution capable of changing heights of the ribs.

In a case in which the blow out grill is installed inside of a room, furniture, curtains, or the like, inside of the room constitute a hindrance to air flow, and the a direction of the air flow needs to be changed. In such a case, by appropriately mounting rails 34 to first rib 27, third rib 33, second rib 32, the direction of the air flow relative to the installing face can freely be adjusted by changing the heights of the ribs.

Panel base portion 23 is constituted by a structure having bell-mouthed shape 36 and an indoors-side opening 35 forming a flow path of carried air in a cylindrical shape on a side of panel connecting face 29.

According to duct connecting portion 22, duct connecting port 21 is disposed in a horizontal direction relative to panel connecting face 29, and duct connecting portion 22 is mounted with panel base portion 23 by locking portion 30.

Locking portion 30 can be locked by being fitted to projected portion 37 provided on an inner side of a cylindrical end face of panel base portion 23. Since projected portion 37 is provided on a circumference, there is constituted a structure in which duct connecting port 21 is slidable horizontally relative to panel connecting face 29.

As shown by FIG. 3 and FIG. 5, duct connecting portion 22 includes sliding knob 40, supported by projected portion 38 in a conical shape provided at an upper portion of an inner face of duct connecting portion 22 and installed at groove portion 39 provided on a circumference of panel base portion 23 and includes shutter 41, an opening amount control apparatus which is slid along an inner wall of duct connecting portion 22. In this way, there is constituted a structure capable of controlling an amount of carried air from duct connecting port 21 by sliding shutter 41.

As shown by FIG. 1, at each floor, the ventilation unit 1 is installed in the ceiling of nondwelling room 10 and sucking grill 5 is installed at the ceiling of nondwelling room 10. The outside of the house and ventilation unit 1 are communicated by outdoors introducing pipe 6 and outdoors exhausting pipe 7. Ventilation unit 1 and blow out grill 3 are communicated by indoors introducing pipe 2. Ventilation unit 1 and sucking grill 5 are communicated by indoors exhausting pipe 4, and an air flowing apparatus 8 is installed between each dwelling room 9 and each nondwelling room 10. Blow out grill 3 is provided in the ceiling disposed above air flow apparatus 8 of dwelling room 9, and a direction of blowing carried air is toward air flow apparatus 8.

A dwelling room indicates a dwelling space of a living room, a Japanese-style room, or the like, in which a person lives; a nondwelling room indicates a space other than a dwelling room such as a passage, a washroom, or the like.

According to the above-described embodiment, outdoors air is introduced into ventilation unit 1 by way of outdoors introducing pipe 6, and supplied to dwelling room 9 from blow out grill 3 by way of indoors introducing pipe 2. Contaminated air from dwelling room 9 is exhausted to nondwelling room 10 by air flow apparatus 8, introduced into ventilation unit 1 via sucking grill 5 and through indoors exhaust pipe 4, and exhausted outside of the house by way of outdoors exhausting pipe 7.

As shown by FIG. 3, carried air introduced to duct connecting portion 22 of blow out grill 3 from indoors introducing pipe 2 flows in a direction, as a main stream, towards an inner side of panel portion 24 by passing through wind blowing path 31, and impinges on an inner side of panel portion 24. Further, the main stream is moved from panel portion 24 to panel connecting face 29, or a vicinity thereof, by impinging on first rib 27 provided at an end portion on the indoor side of panel portion 24. Carried air flowing along panel connecting face 29 forms a flow in a vertical direction by impinging on second rib 32, and is joined with a flow in a horizontal direction of carried air which is not in line with panel connecting face 29. As a result, the flow is blown out to the dwelling room from blow out port 28 at a constant angle relative to the ceiling face. By the Coanda effect, the air supplied from blow out port 28 does not flow too near the ceiling, but flows substantially in a horizontal direction in a vicinity of the ceiling, and therefore the ceiling face is not contaminated and an unpleasant draft can be prevented. When the panel portion is formed in a square shape, in a vicinity of a corner of panel portion 24, an interval between first rib 27 and second rib 32 becomes larger than in other areas and an opening width of blow out port 28 becomes large. Therefore, the air blown out from the blow out port 28 becomes a flow along the installing face and contaminates the installing face. Hence, as shown in FIG. 4, by providing third rib 33 at the corner portion of panel 24, an air flow of carried air which is not in line with panel connecting face 29 is formed, and the carried air impinges on panel connecting face 29 to form a flow directed to a lower side.

The air is blown out to the inside of a room so that a component directed to a lower side to be along an inner side of second rib 32 formed at panel base portion 23 is large. Thereby, the air flow in a direction away from the installing face is formed. Air blown out substantially in the horizontal direction from blow out grill 3 is directed to a wall face present at a location remote from air flow apparatus 8 and in a vicinity of the ceiling, flows to the floor along the wall face, and is exhausted to outside of the room by air flow apparatus 8 along the wall face of dwelling room 9. That is, carried air is exhausted from air flow apparatus 8 after circulating inside of the dwelling room, and therefore ventilation can sufficiently be carried out without stagnation.

When dwelling room 9 is large, or an aspect ratio thereof is large, there is a possibility that air blown out from blow out grill 3 does not reach a wall face in a blowing direction and stagnation occurs in a vicinity of the wall face. Hence, by increasing an air speed from blow port 28 by reducing an opening area of blow out port 28, carried air can reach the wall face, and therefore stagnation can be prevented from being brought about in a vicinity of the wall face. Here, when the speed of blown-out air is increased, by the Coanda effect, carried air flows along with the ceiling face, and the ceiling face in a vicinity of the blow out grill is contaminated by dust, or the like, mixed with the carried air. By making second rib 32 higher, an amount of carried air flowing in the vertical direction can be increased by second rib 32. In this way, the angle of the air blown out from blow out port 28 can be change to a more vertical direction, and therefore, blown air is not along the ceiling face, and the ceiling face can be prevented from being contaminated.

Since first rib 27 is provided at an end portion or a vicinity of the end portion, of panel portion 24, an inner structure of the blow out grill is difficult to see from the room, and the view in the room can be prevented from being deteriorated. Further, although an inner side face of panel portion 24 is contaminated by dust, or the like, mixed in the carried air, since the contaminated face is flat, unlike the shape of the louver of the background art, a result of being easy to wipe to clean is achieved. The problem is resolved by a structure simpler than that of the blow out grill of the background art, and therefore a very inexpensive blow out grill can be provided.

Indoors side opening 35 of panel base portion 23 is constituted by a structure having bell-mouthed shape 36, and therefore a vortex is difficult to produce in a vicinity of indoors side opening 35. As a result, a pressure loss can be reduced. By reducing the pressure loss, the energy necessary to provide a necessary ventilation amount can be reduced.

As a method of constructing the blow out grill, it is normal to connect indoors introducing pipe 2 and duct connecting port 21, and thereafter install the blow out grill in the ceiling face. However, when the blow out grill in a square shape is used, caution is required in choosing a direction of installation of the blow out grill so that the view in the dwelling room is not deteriorated. When an angle of the duct connecting portion relative to the panel base portion is constant, as in the blow out grill of the background art, there is a problem that the installing direction cannot be changed, or that when the blow out grill is forcibly rotated, a pressure loss is produced or the indoors introducing pipe is detached. However, according to the present invention, the angle of duct connecting portion 22 and panel base portion 23 can be changed, and therefore the direction of installation of the blow out grill can be changed even after having been connected to indoors introducing pipe 2. That is, the problem can be prevented from being brought about.

In the path having the lowest pressure loss among the paths from ventilation unit 1 to the blow out grills 3 provided in the dwelling rooms 9, the amount of carried air is larger than that of the other paths. When the dwelling room at a destination of the air is a small dwelling room, a wind amount more than necessary is supplied, as a result, the dwelling room receives more warming heat than necessary. By controlling the wind amount by closing shutter 41 of the blow out grill provided in the dwelling room, the wind amount more than necessary can be excluded, and more warming heat than necessary can be prevented from being brought about.

As described above, the invention can provide a blow out grill which simultaneously prevents contamination of the blow out grill installing face and an unpleasant draft, does not deteriorate the view from inside of the room, incapable of controlling the air flow inside of the room, is easy to clean and is inexpensive.

INDUSTRIAL APPLICABILITY

The constitution of the blow out grill having first air-flow-guiding projected portion and a second air-flow-guiding projected portion is applicable to a blow out grill for an air supplying ventilation apparatus, including an air blowing apparatus of a blower, or the like, inside thereof. Further, the constitution is also applicable to a blow out grill of a natural air supply port directly connected to the outside of a house by way of a duct.

The invention claimed is:

1. A blow out grill comprising:
   an outdoors-side opening communicated with a duct;
   an indoors-side opening communicated with the inside of a room;
   a panel base portion forming a wind blowing path of carried air between the indoors-side opening and the outdoors-side opening;
   a panel portion formed in a polygonal shape, and disposed opposite to the panel base portion;
   a blow out port communicated with the wind blowing path and formed between the panel portion and the panel base portion, the blow out port having a substantially L-shaped opening;
   a first air-flow-guiding projected portion formed at the panel base portion and directed to a side of the panel portion;
   a second air-flow-guiding projected portion formed at the panel portion and directed to a side of the panel base portion; and
   a third air-flow-guiding projected portion, disposed at a corner portion of the polygonal shape of the panel portion, the corner portion being a portion from which air is discharged from the blow out grill, a plane of the third air-flow-guiding projected portion being parallel to a plane of the first air-flow-guiding projected portion, the third air-flow-guiding projected portion being formed so as to project closer to the panel base portion than the second air-flow-guiding projected portion, and having a substantially L-shaped cross-section parallel to a plane of the panel portion.

2. The blow out grill of claim 1, wherein the second air-flow-guiding projected portion is provided at an outer peripheral edge of the panel portion.

3. The blow out grill of claim 1, wherein a height of the first air-flow-guiding projected portion, the second air-flow-guiding projected portion, or the third air-flow-guiding projected portion is made to be able to be changed.

4. The blow out grill of claim 1, further comprising:
   an interval adjusting apparatus operable to change or to set an interval between the panel base portion and the panel portion.

5. The blow out grill of claim 1, wherein the blow out port is constituted between the panel base portion and an outer peripheral portion of the panel portion present on an inner side of an outer peripheral edge of the panel base portion.

6. The blow out grill of claim 1, wherein the indoors-side opening of the panel base portion has a bell-mouthed shape.

7. The blow out grill of claim 1, wherein an angle of the outdoors-side opening can arbitrarily be set relative to the panel base portion.

8. The blow out grill of claim 1, further comprising:
   a wind amount control apparatus operable to change an opening area of the outdoors side opening by overlapping with the outdoors side opening and being slid along an inner face of the panel base portion.

9. An air conditioning ventilation system comprising an air flow apparatus for communicating an outside of a room with an inside of the room via the blow out grill of claim 1, wherein the blow out grill is provided in a vicinity of the air flow apparatus, and carried air is blown out in a direction away from the air flow apparatus.

10. The blow out grill of claim 1, wherein the third air-flow-guiding projected portion is disposed on an inner side of the second air-flow guiding projected portion.

* * * * *

UNITED STATES PATENT AND TRADEMARK OFFICE
CERTIFICATE OF CORRECTION

| | | |
|---|---|---|
| PATENT NO. | : 7,635,297 B2 | Page 1 of 1 |
| APPLICATION NO. | : 10/592380 | |
| DATED | : December 22, 2009 | |
| INVENTOR(S) | : Kei Takeshita et al. | |

It is certified that error appears in the above-identified patent and that said Letters Patent is hereby corrected as shown below:

On the Title Page, Item (56) References Cited, under the "FOREIGN PATENT DOCUMENTS" heading, "JP 52-111954" should read --JP 54-111954--.

Signed and Sealed this

Eighteenth Day of May, 2010

David J. Kappos
*Director of the United States Patent and Trademark Office*